United States Patent
Tian et al.

(10) Patent No.: US 11,983,782 B2
(45) Date of Patent: May 14, 2024

(54) METHOD, DEVICE, STORAGE MEDIUM AND PROGRAM PRODUCT FOR CARBON TRADING

(71) Applicant: VeChain Global Technology, S.AR.L, Luxembourg (LU)

(72) Inventors: Xinli Tian, Shanghai (CN); Jianliang Gu, Shanghai (CN)

(73) Assignee: VECHAIN GLOBAL TECHNOLOGY SARL, Luxembourg (LU)

( * ) Notice: Subject to any disclaimer, the term of this patent is extended or adjusted under 35 U.S.C. 154(b) by 651 days.

(21) Appl. No.: 17/250,171

(22) PCT Filed: Jun. 27, 2019

(86) PCT No.: PCT/IB2019/055460
§ 371 (c)(1),
(2) Date: Dec. 8, 2020

(87) PCT Pub. No.: WO2020/003202
PCT Pub. Date: Jan. 2, 2020

(65) Prior Publication Data
US 2021/0248694 A1    Aug. 12, 2021

(30) Foreign Application Priority Data
Jun. 25, 2018   (CN) .......................... 201810664969.7

(51) Int. Cl.
*G06Q 50/06* (2012.01)
*G06Q 20/38* (2012.01)

(52) U.S. Cl.
CPC ....... *G06Q 50/06* (2013.01); *G06Q 20/38215* (2013.01); *G06Q 20/3827* (2013.01); *G06Q 2220/00* (2013.01)

(58) Field of Classification Search
None
See application file for complete search history.

(56) References Cited

U.S. PATENT DOCUMENTS

2011/0208621 A1   8/2011   Feierstein et al.
2014/0100937 A1   4/2014   Na et al.
(Continued)

FOREIGN PATENT DOCUMENTS

CN    107423945 A    12/2017
CN    107545434 A    1/2018
(Continued)

OTHER PUBLICATIONS

"Edward Dodge, A New Model for Carbon Pricing Using Blockchain Technology, Sep. 22, 2015" (Year: 2015).*
(Continued)

*Primary Examiner* — Kito R Robinson
*Assistant Examiner* — Toan Duc Bui
(74) *Attorney, Agent, or Firm* — Downs Rachlin Martin PLLC

(57) ABSTRACT

The present disclosure provides a method, a device, a storage medium and a program product for carbon trading. The method for carbon trading includes acquiring identification data and carbon behavior data of a transport device, the carbon behavior data indicating at least one of carbon consumption behavior and carbon emission reduction behavior of the transport device and the identification data including at least an identity corresponding to the transport device; in response to determining that the identity is in a predetermined identity set, acquiring an attribute corresponding to the transport device based on the identity; and determining, based on the carbon behavior data and a first smart contract matching with the attribute, a carbon emission reduction equivalent corresponding to the carbon
(Continued)

behavior data, the first smart contract being provided for converting the carbon behavior data to the carbon emission reduction equivalent; transmitting the carbon emission reduction equivalent to a blockchain platform to store in a first account associated with a first object, the first object being associated with a plurality of transport devices; and publishing carbon trading associated with the carbon emission reduction equivalent in the first account as a blockchain transaction.

2 Claims, 5 Drawing Sheets

(56) References Cited

U.S. PATENT DOCUMENTS

| | | | |
|---|---|---|---|
| 2017/0011460 | A1 | 1/2017 | Molinari et al. |
| 2017/0017955 | A1 | 1/2017 | Stern et al. |
| 2017/0358041 | A1 | 12/2017 | Forbes et al. |
| 2018/0018723 | A1* | 1/2018 | Nagla .................... H04L 63/08 |
| 2018/0082290 | A1 | 3/2018 | Allen et al. |
| 2018/0089638 | A1 | 3/2018 | Christidis et al. |
| 2019/0013948 | A1* | 1/2019 | Mercuri ................. G06F 16/27 |
| 2019/0044700 | A1* | 2/2019 | Leddy ................... H04L 9/3239 |
| 2019/0057396 | A1* | 2/2019 | Cui ....................... G06Q 30/018 |
| 2019/0102509 | A1* | 4/2019 | Thibault ................ G06Q 10/00 |
| 2021/0248694 | A1* | 8/2021 | Tian ...................... G06Q 50/06 |

FOREIGN PATENT DOCUMENTS

| | | |
|---|---|---|
| JP | 2010238091 A | 10/2010 |
| JP | 2013171578 A | 9/2013 |
| KR | 10-2010-0051179 A | 5/2010 |

OTHER PUBLICATIONS

"An Introduction to Blockchain Technology and Its Legal Implications, Oct. 3, 2017" (Year: 2017).*

"Guidelines for Measuring and Managing CO2 Emission from Freight Transport Operations, Issue 1, Mar. 2011" (Year: 2011).*

"Fact Shee: Vehicle Efficiency and Emissions Standards, EESI Environmental and Energy Study Institute, Aug. 26, 2015" (Year: 2015).*

"Bobby Magill, Is Bike Sharing Really Climate Friendly, Climate Central, Aug. 19, 2014" (Year: 2014).*

"New MIT app: check if your car meets climate targets, Danna Nuccitelli, Sep. 28, 2016" (Year: 2016).*

"Token Burning and Other Crypto Jargon Simplified, Eidoo Brandvoice, Nov. 29, 2017" (Year: 2017).*

Anonymous: "Blockchain—Wikipedia," (URL:https://en.wikipedia.org/w/index.php?title+Blockchain&oldid+847384538) Jun. 24, 2018.

Pike, E., "Calculating Electric Drive Vehicle Greenhouse Gas Emissions." Vehicle Electrification Policy Study, The International Council on Clean Transportation, Task 5 Report (Aug. 2012).

* cited by examiner

METHOD, DEVICE, STORAGE MEDIUM AND PROGRAM PRODUCT FOR CARBON TRADING

FIELD

The present disclosure relates to the field of carbon emission, and more specifically, to a method, a device, a computer-readable medium and a computer program product for blockchain-based carbon trading.

BACKGROUND

The objects of traditional carbon trading solutions are emission reductions (i.e., quota) or emission reduction vouchers (such as "Chinese Certified Emission Reduction," i.e., CCER; an enterprise may obtain the corresponding amount of CCER by cutting down greenhouse gasses by implementing the projects regarding new energy terminals, for example) originally allocated to the enterprise by the policy maker; and the objects targeted by the traditional carbon trading methods or platforms are enterprises related to carbon consumption and carbon emission control (or emission reduction), rather than individuals.

In the traditional carbon trading solutions, the above emission reductions or emission reduction vouchers can be used by the carbon emission-controlling enterprises to burn or exchange the carbon emissions of the carbon-consuming enterprises, so as to appropriately lower the costs of the carbon emission-reducing projects implemented by the carbon emission-controlling enterprises, or to bring certain profits to the emission-controlling enterprises, which further promotes the development of an enterprise from high carbon emission to low carbon emission. In the traditional carbon trading solutions, the carbon trading platforms are isolated from each other and could not share the carbon emission reduction data. In addition, the traditional carbon trading platforms have problems such as inaccurate carbon emission reduction data and the like.

At present, the usage of new energy terminals, such as new energy vehicles and shared bicycles, is expanding year by year. Individual users may generate carbon emission reductions by the behavior of renting or utilizing the new energy vehicles and shared bicycles, for example. Although the carbon emission reduction generated by each individual user is small in amount, the accumulated amount will be huge. The traditional carbon trading solutions lack effective means to collect, record, certify and utilize the carbon emission reductions generated by the carbon emission reduction behavior in units of individual users, which further makes it hard to incorporate the carbon emission reductions generated by individual users due to the use of new energy terminals into the carbon trading platforms to certify, manage and trade as the carbon emission reduction resources. Therefore, a large amount of carbon emission reduction resources are unused and wasted, which is unfavorable to improve the motivations of the individual users and manufacturing enterprises and service providers of the new energy terminals participating the carbon emission reduction behavior.

SUMMARY

The present disclosure provides a method and a device for carbon trading, which can effectively and accurately record, convert and incorporate the carbon emission reductions generated by the individual users due to the use of the new energy terminals into certification, management and trading of the carbon emission reduction resources.

According to a first aspect of the present disclosure, there is provided a method for carbon trading. The method for carbon trading includes acquiring identification data and carbon behavior data of a transport device, the carbon behavior data indicating at least one of carbon consumption behavior and carbon emission reduction behavior of the transport device and the identification data including at least an identity corresponding to the transport device; in response to determining that the identity is in a predetermined identity set, acquiring an attribute corresponding to the transport device based on the identity; determining, based on the carbon behavior data and a first smart contract matching with the attribute, a carbon emission reduction equivalent corresponding to the carbon behavior data, the first smart contract being provided for converting the carbon behavior data to the carbon emission reduction equivalent; transmitting the carbon emission reduction equivalent to a blockchain platform to store in a first account associated with a first object, the first object being associated with a plurality of transport devices; and publishing carbon trading associated with the carbon emission reduction equivalent in the first account as a blockchain transaction.

According to a second aspect of the present disclosure, there is also provided a device for carbon trading. The device includes a memory configured to store one or more programs; and a processor coupled to the memory and configured to execute the one or more programs to cause the device to perform the method according to the first aspect of the present disclosure.

According to a third aspect, there is provided a non-transitory computer-readable medium, which has machine-executable instructions stored thereon, the machine-executable instructions, when executed, causing a machine to perform the method according to the first aspect of the present disclosure.

According to a fourth aspect, there is provided a computer program product, which is tangibly stored on a non-transitory computer-readable medium and includes machine-executable instructions, the machine-executable instructions, when executed, causing a machine to perform the method according to the first aspect of the present disclosure.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features and advantages of the present disclosure will become more apparent, wherein the same reference sign usually refers to the same component in the example embodiments of the present disclosure.

Figure 1:
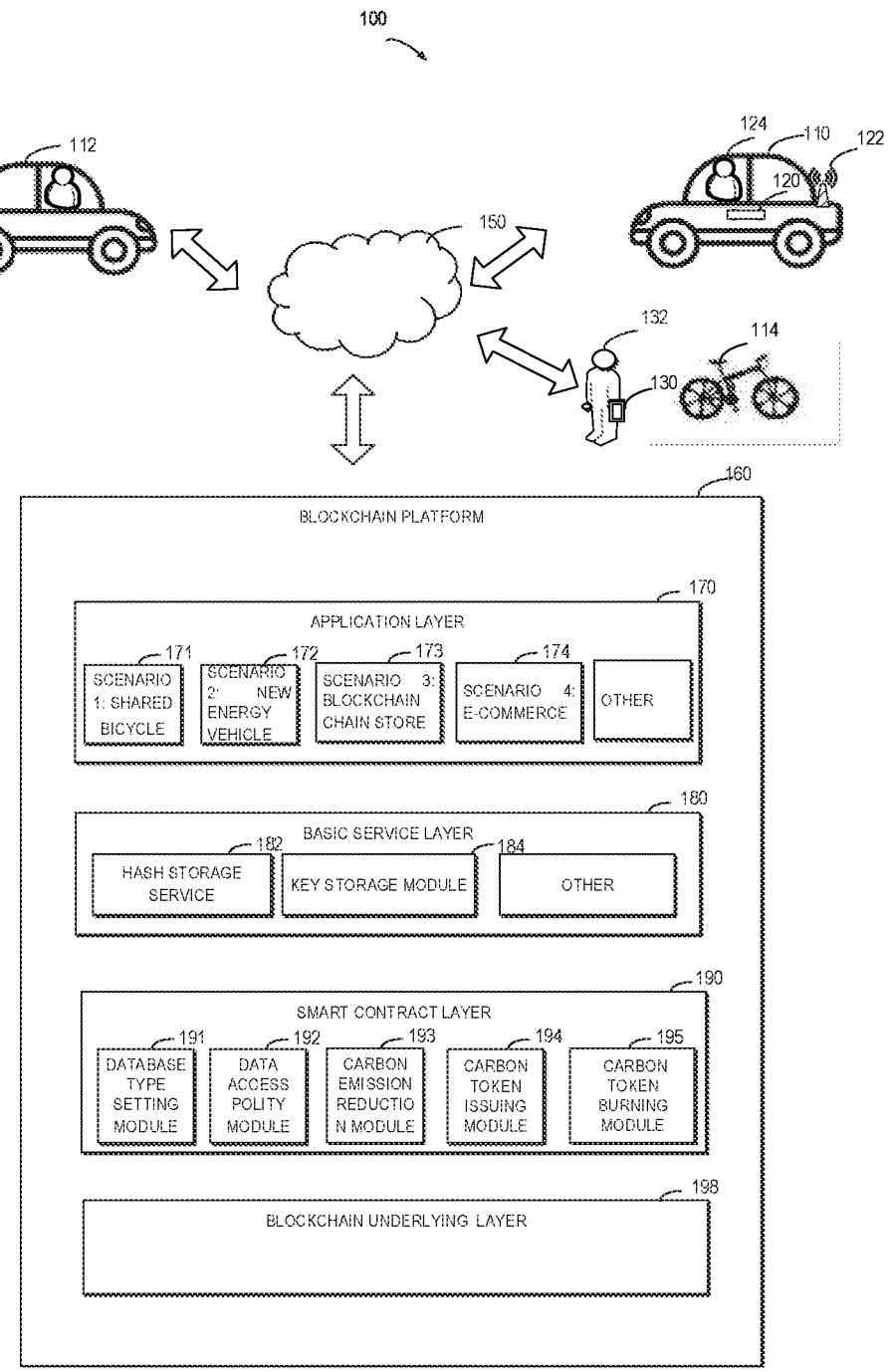
FIG. 1 illustrates an architecture diagram of a carbon trading system 100 according to embodiments of the present disclosure.

In each drawing, same or corresponding signs indicate the same or corresponding components.

DETAILED DESCRIPTION OF EMBODIMENTS

The preferred embodiments of the present disclosure will be described in more detail with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following description may also include other explicit and implicit definitions.

As described above, the traditional carbon trading platforms are isolated from each other and lack data sharing, and the carbon emission reduction data is not verified by a third party, such that the authenticity of the data cannot be effectively guaranteed. In addition, the carbon trading platforms are all for enterprises rather than for individual users. Therefore, the carbon emission reductions of the individual users due to the use of new energy terminals cannot be effectively and accurately recorded and converted. Furthermore, the above carbon emission reductions generated by the individual users cannot be incorporated into the carbon trading platforms for certification, management and trading of the carbon emission reduction resources.

To solve at least one of the above problems and one or more of other potential problems, example embodiments of the present disclosure propose a carbon trading solution. In this solution, it is first acquired the identity (ID) and carbon behavior data corresponding to a transport device used by an individual user. After it is determined that the ID is in a predetermined set, an attribute of the transport device is acquired based on the ID, and a corresponding carbon emission reduction equivalent is determined based on the above acquired carbon behavior data and a first smart contract matching with the attribute of the above transport device. Then, the determined carbon emission reduction equivalent is transmitted to a blockchain platform for storage in an enterprise account associated with the transport device, and the carbon trading related to the carbon emission reduction equivalent in the enterprise account is published as a blockchain transaction.

In the above solution, by acquiring the carbon behavior data of the transport device used by the individual user, the data generated by the individual user using the transport device can be effectively collected for conversion of the carbon emission reduction equivalent. It may ensure that the carbon behavior data comes from a certified and verified transport device by confirming that the acquired transport device ID is in the predetermined set, which further guarantees reliability of the source of the carbon behavior data. The carbon emission reduction equivalent is determined via a smart contract based on the carbon behavior data, and the carbon emission reduction equivalent and its related carbon trading are transmitted to the blockchain platform and published, which may ensure that the conversion standard and the conversion result of the carbon emission reduction equivalent and the consensus of the associated carbon trading data and that they will not be tampered. Furthermore, the carbon emission reduction equivalent is determined by using a first smart contract matching with the attribute of the transport device such that the carbon trading solution may be suitable to accurately compute carbon emission reduction equivalents for different types of transport devices. Moreover, the carbon emission reduction equivalent, which is determined based on the carbon behavior data of the transport device utilized by the individual user, is stored in the associated enterprise account so as to facilitate aggregating small amounts of carbon emission reduction equivalents generated by a plurality of individual users and thus performing the carbon trading such as issuance and distribution of carbon tokens, etc. Hence, the carbon trading solution according to the example embodiments of the present disclosure can effectively and accurately record, convert and incorporate the carbon emission reductions generated by the individual users due to the use of new energy terminals into certification, management and trading of the carbon emission reduction resources.

FIG. 1 illustrates an architecture diagram of a carbon trading system 100 according to embodiments of the present disclosure. As shown in FIG. 1, the system 100 includes a plurality of transport devices and a blockchain platform 160, wherein the plurality of transport devices may exchange data with the blockchain platform 160 via a network 150. In some embodiments, the network 150 performs wireless communications and information exchange between mobile terminals, vehicles and Internet in accordance with an agreed communication protocol and data exchange standard. The network 150 may be a mobile network, a generalized Internet of Things and the like, for example.

The plurality of transport devices, for example, may include one or more Battery Electric Vehicles (BEV) 110, one or more Hybrid Electric Vehicles (HEV) 112 and one or more shared bicycles 114, wherein the BEV supplies power to the electric motor from a fully pre-charged battery, and the electric motor drives the vehicle. The battery capacity may be supplemented by an external power source. The HEV refers to a vehicle containing one combustion engine and one or more electric motors. Each transport device has corresponding unique identification data, which at least includes an ID uniquely identifying the transport device. The ID, for example, may be a frame number of the transport device, or may be a combination of the frame number and the engine number of the transport device. In some embodiments, the transport device is provided with an on-board module 120, which, for example, is an on-board intelligent terminal with wireless communication functions for dynamically monitoring and managing the running vehicle. The on-board intelligent terminal may record and transmit the ID and the carbon behavior data of the transport device (such as traveled distance, fuel consumption and electricity consumption) as well as other data. In some embodiments, the on-board module 120 may transmit, via a wireless communication apparatus 122, the recorded ID and carbon behavior data of the transport device. In some embodiments, the ID and carbon behavior data of the transport device are transmitted via a mobile terminal 130 owned by a user. By taking the BEV 110 as an example, after a user 124 has used the BEV 110, the BEV 110 may further transmit, via the network 150, the ID and the carbon behavior data recorded by the on-board module 120 to the blockchain platform 160. By taking the shared bicycle 114 as another example, after a user has used the shared bicycle 114, the mobile terminal 130 owned by the user who uses the shared bicycle 114 may acquire, via an application installed on the mobile terminal 130, the ID (e.g., the frame number) and the carbon behavior data (such as traveled distance) of the shared bicycle 114, and may transmit, via the network 150, the ID and the carbon behavior data to the blockchain platform 160.

The blockchain platform 160, on the architecture level, may include an application layer 170, a basic service layer 180, a smart contract layer 190 and a blockchain underlying layer 198, for example. The blockchain platform 160 may acquire, via the network 150 and an application program interface (not shown), the ID and the carbon behavior data corresponding to the transport device used by the user.

The blockchain underlying layer 198, i.e., public blockchain layer, is logically positioned at the bottom layer of the blockchain platform 160 for providing services and protocols associated with the public blockchain.

The smart contract layer 190 may include a database type setting module 191, a data access policy module 192, a carbon emission reduction module 193, a carbon token issuing module 194 and a carbon token burning module 195 etc. The database type setting module 191 may be a smart contract for setting database type according to different characteristics of data to be transmitted to the blockchain. The database type that is set may include a database type for basic information, a database type for tracking information, and a database type for ownership information, for example. Herein, the database type for basic information is used for storing data that will not be updated after storage, such as basic information of the transport device (e.g., ID, model and manufacture time of the vehicle, etc.). The basic information is only stored once and will not be updated once being stored. The database type for tracking information is used for storing data that may be updated from time to time, such as the determined carbon emission reduction equivalent and data related to the carbon trading procedure. Such information will be updated, for example, along with the new carbon behavior data being generated, and the updating procedure and updated result should also be stored. The database type for ownership information is provided for storing data related to ownership of the transport device and the change thereof. For example, in case of vehicle transfer, information on historical transfer procedures of the ownership of the vehicle may be stored. The data access policy module 192 may be a smart contract for determining the data access policy and rights based on the data type. The carbon emission reduction module 193 may include smart contracts for determining, based on the attribute and the carbon behavior data of the transport device, the carbon emission reduction equivalent, which may be programmed based on scientific carbon emission reduction models. The carbon token issuing module 194 may be a smart contract for issuing the carbon tokens based on the carbon emission reduction equivalents or the carbon emission reduction vouchers. The carbon token burning module 195 may be a smart contract for burning the carbon tokens so as to unlock the corresponding carbon emission reduction equivalents or carbon emission reduction vouchers. The means for determining the carbon emission reduction equivalent and issuing and burning the carbon tokens will be described in detail in the following description and is omitted here.

The basic service layer 180 is provided for implementing data connection between the smart contract layer 190 and the application layer 170. The basic service layer 180 may include a Hash Storage Service (HSS) module 182, a key storage module 184 and the like, for example. Herein, the HSS module 182 is used for providing distributed data storage, e.g., for storing the raw identification data and carbon behavior data of the transport device acquired through the network 150 and hash values of the raw identification data and carbon behavior data to be transmitted to the blockchain for storage in a distributed manner. The data stored in the distributed manner may be transferred to a third party organization for management. The key storage module 184 is used for providing management for addresses, accounts, wallets and passwords and the like for the blockchain platform.

The application layer 170 may include a plurality of standard application modules for different application scenarios. The application layer 170 may include a shared bicycle module 171 for scenario 1, a new energy vehicle module 172 for scenario 2, and a blockchain chain-store module 173 for scenario 3, and an e-commerce module 174 for scenario 4, etc. The application layer 170 may further include more other application scenario modules to meet application requirements of various users in various business scenarios. For example, the various business scenarios may also include an owner gaming scenario, an owner social scenario and the like. The above standard application modules are used for providing applications for corresponding business scenarios so as to exchange data with users according to the business logics. The shared bicycle module 171, as an example, may receive an inquire from the user about the traveled distance of the shared bicycle 114 or the carbon token balance, and may receive an input request for exchanging or transferring the carbon tokens. the shared bicycle module 171 may further generate, in response to detecting the user's input, output data such as data indicating the traveled distance of the shared bicycle 114, personal account balance, carbon emission reduction data and related data of the carbon token account etc., based on the data stored by the hash storage service module 182 of the basic service layer 180 and execution of a corresponding smart contract of the smart contract layer 190.

In some embodiments, the above carbon trading system 100 may be implemented as an application server including one or more hosts (the host may be the device 600 shown in FIG. 6, for example), for example. Each host may include a memory stored with one or more programs and a processor coupled to the memory. The processor is configured to acquire, via the network 150 and the application interface (or via distributed storage devices associated with the hash storage service module 182), the identification data and the carbon behavior data of the transport devices (e.g., the battery electric vehicle 110, the hybrid electric vehicle 112 and the shared bicycle 114) used by a plurality of individual users. The memory is further configured to, in response to determining that the transport device identity in the identification data is in a predetermined identity set (e.g., an identity set certified by a third party organization), acquire an attribute (such as vehicle model) of the corresponding transport device based on the transport device identity. The memory is further configured to select, based on the attribute, a first smart contract matching with the attribute from the plurality of smart contracts in the carbon emission reduction module 193 of the smart contract layer 190, and then determine the carbon emission reduction equivalent corresponding to the carbon behavior data. The memory is further configured to transmit the determined carbon emission reduction equivalent to the blockchain platform for storage in a first account associated with a first object (such as the manufacturing enterprise of the new energy terminals). The memory is further configured to publish the carbon trading associated with the carbon emission reduction equivalent in the first account to the public blockchain as a blockchain transaction.

In the above carbon trading system 100, by selecting a first smart contract matching with the attribute of the transport device from a plurality of first smart contracts in the carbon emission reduction module 193 based on the attribute of the transport device to convert the carbon emission reduction equivalent, and storing the relative small amount of carbon emission reduction data that is converted due to the use of different transport devices by the individual users in the enterprise account to facilitate aggregation and participation in the subsequent carbon trading, the carbon trading system 100 can effectively and accurately record, convert and incorporate the carbon emission reductions generated by the individual users due to the use of different types of new energy terminals into certification, management and trading of the carbon emission reduction resources. Besides, based on the converted carbon emission reduction equivalent, carbon token issuance, distribution and burning as well as other functions may be implemented via the carbon token issuing module 194 and the carbon token burning module 195, such that the individual users and the enterprises will be more active in participating in the carbon emission reduction behavior and projects.

Figure 2:
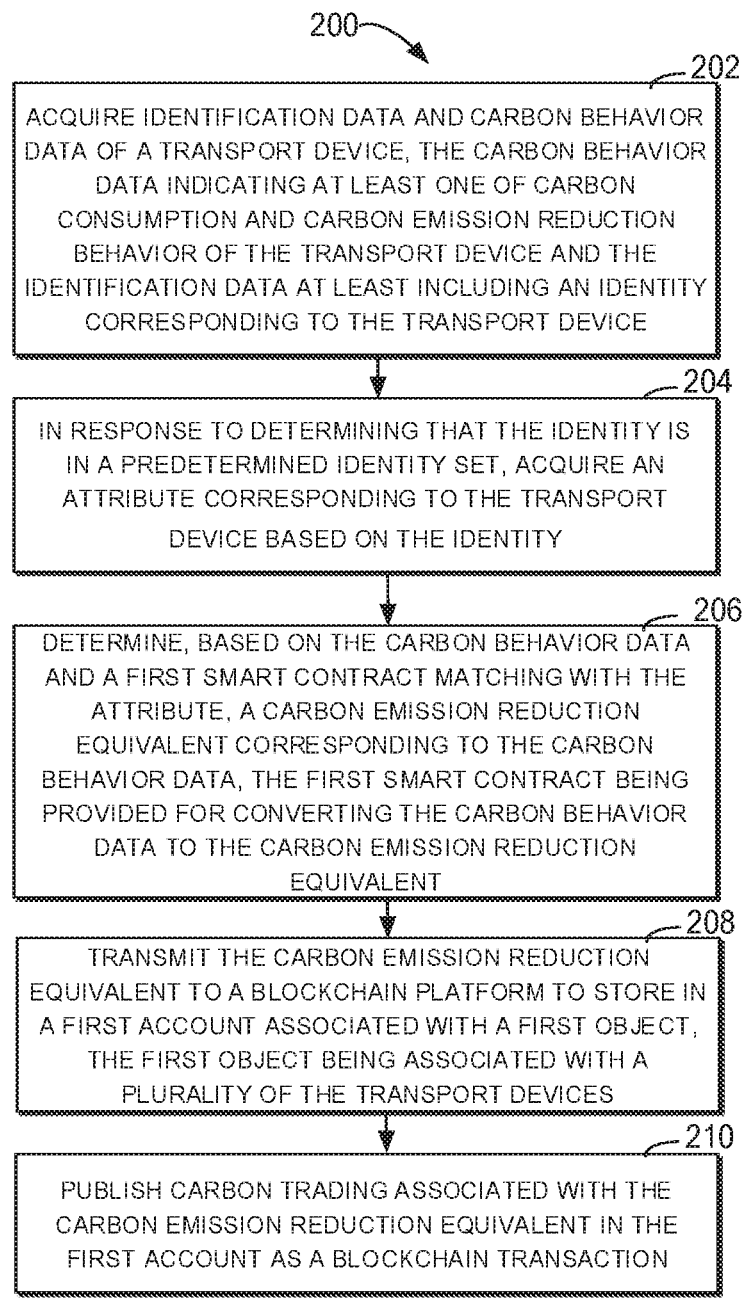
FIG. 2 illustrates a flowchart of a carbon trading method 200 according to embodiments of the present disclosure.

FIG. 2 illustrates a flowchart of a carbon trading method 200 according to embodiments of the present disclosure. In FIG. 2, each action may be executed by a processor (e.g., a central processing unit 601 in the device 600 shown in FIG. 6), for example. The method 200 may also include additional actions not shown and/or shown actions may be omitted. The scope of the present disclosure is not restricted in this regard.

At block 202, the identification data and the carbon behavior data of the transport device are acquired, wherein the carbon behavior data indicates at least one of carbon consumption behavior and carbon emission reduction behavior of the transport device and the identification data at least includes an identity (ID) corresponding to the transport device. In some embodiments, the ID may be a frame number of the transport device or a combination of the frame number and the engine number of the transport device, for example.

In some embodiments, the identification data and the carbon behavior data are acquired from a distributed storage device, the on-board module of the transport device or an application on the mobile terminal associated with the transport device. The transport device may include at least one of the battery electric vehicle 110, the hybrid electric vehicle 112 and the shared bicycle 114. In some embodiments, the carbon behavior data at least includes traveled distance, fuel consumption and electricity consumption corresponding to at least one of the carbon consumption behavior and the carbon emission reduction behavior. In some embodiments, the transport device includes one or more public bicycles 114 and/or one or more public battery electric vehicles 110, wherein the acquired carbon behavior data at least includes the traveled distance corresponding to at least one of the carbon consumption behavior and the carbon emission reduction behavior of the above transport device. In some embodiments, the carbon trading method 200 may acquire, via the network 150 (e.g., Internet of Things) and the application program interfaces, the corresponding IDs and the carbon behavior data of various types of transport devices utilized simultaneously by a plurality of different users. Each carbon behavior data indicates the carbon consumption behavior and the carbon emission reduction behavior of the transport device utilized by the user. In this way, the carbon trading method 200 may effectively acquire the carbon behavior data of different transport devices utilized by a plurality of individual users for conversion and aggregation of the carbon emission reduction equivalents.

At block 204, in response to determining that the identity is in the predetermined identity set, an attribute of the corresponding transport device is acquired based on the identity. In some embodiments, after the ID and the carbon behavior data of the transport device are acquired, it is determined whether the acquired ID is in a predetermined set (e.g., the predetermined identity set includes the identities of the transport devices certified by a third party authority). If it is determined that the ID is in the predetermined set, the attribute of the corresponding transport device is acquired based on the ID, so as to determine a smart contract that is matched with the attribute and is provided for determining the carbon emission reduction equivalent, e.g., the first smart contract matching with the attribute. In some embodiments, the attribute may be the model of the transport device and the model is acquired by querying a pre-stored mapping table between the ID and the model of the transport device, for example. In some embodiments, the acquired identification data of the transport device may directly include the attribute of the corresponding transport device.

At block 206, the carbon emission reduction equivalent corresponding to the carbon behavior data may be determined based on the carbon behavior data and the first smart contract matching with the attribute, the first smart contract being provided for converting the carbon behavior data into the carbon emission reduction equivalent. Different models of vehicles vary in many aspects, such as displacement, power, passenger capacity and vehicle curb weight etc., and these aspects may usually impact the computing model of the carbon emission reduction equivalent. In some examples, first smart contracts may be associated with different models of vehicles so as to determine the corresponding carbon emission reduction equivalents based on the carbon behavior data.

In some embodiments, based on the attribute of the transport device, a first smart contract matched with the attribute is selected from a plurality of first smart contracts for converting the carbon emission reduction equivalent stored in the carbon emission reduction module 193, so as to determine the carbon emission reduction equivalent corresponding to at least one of the carbon consumption behavior and the carbon emission reduction behavior of the transport device. The carbon emission reduction equivalents may be determined by using the respective first smart contracts matched with different models of the vehicles, such that the carbon trading solution can accurately compute the corresponding carbon emission reduction equivalents for different types of transport devices at the same time.

Regarding the determination of the carbon emission reduction equivalent based on the matched first smart contract, in some embodiments, the carbon emission reduction equivalent may be determined based on the baseline carbon emission and the carbon emission of the transport device. Herein, the baseline carbon emission indicates the carbon emission of a fuel-burning transport device with one or more similar attribute(s) to that of the subject transport device for travelling the traveled distance, and the carbon emission of the transport device indicates the carbon emission of the transport device used by the user for the corresponding traveled distance. In some embodiments, the carbon emission reduction equivalent may be determined based on the baseline carbon emission, the carbon emission of the transport device and the leakage. Herein, the leakage indicates leakage associated with the transport device. The leakage generally may be set to 0.

Specifically, the carbon emission reduction equivalent may be determined based on the following formula (1)

$$ER=BE-PE-LE \quad (1)$$

A part of the data for constructing a first smart contract in the carbon emission reduction module 193 is measured data, and another part is preset data. The measured data, for example, may be the corresponding ID and the carbon behavior data of the transport device used by the user, which may be acquired via the network 150 and the application interfaces (or via distributed storage devices associated with the hash storage service module 182). The preset data, for example, may be stored on the distributed storage devices that are checked or supervised by a third party, and may be set to be updatable so as to be updated in accordance with different situations. A construction model for the first smart contract and related parameters thereof will be explained below.

Here, ER indicates emission reduction of the transport device in units of (t CO2e), for example, and the Emission Reduction (ER) indicates the emission reduction achieved by the use of the new energy vehicle in substitution of a traditional fuel-burning vehicle, which may be referred to as carbon emission reduction equivalent after quantization. BE indicates Baseline Emission in units of (t CO2e), for example, and the Baseline Emission (BE) is the carbon emission assuming that a baseline fuel-burning vehicle with a similar attribute is used. PE indicates project emission of the transport device in units of (t CO2e), for example, and the project emission (PE) of the transport device may, for example, indicate the CO2 emission generated by using the current new energy vehicle. For the battery electric vehicle 110, the CO2 emission may, for example, include the electricity consumption resulted from charging the battery of the electric vehicle by an external power grid. For the hybrid electric vehicle, the CO2 emission may, for example, include both electricity consumption and fuel consumption of the hybrid electric vehicle. LE indicates the leakage of the transport device in units of (t CO2e). In general, there may be not leakage in the transport device and thus the leakage (LE) may be set to 0. In some embodiments, the determination of the Emission Reduction (ER) of the transport device, the Baseline Emission (BE) and the project emission (PE) of the transport device may take into account the influence of the factor of the service life y of the transport device and the baseline vehicle. For example, the above parameters respectively may multiply by a corresponding service life influencing factor preset based on the corresponding service life y.

The baseline fuel-burning transport device with a similar attribute to the subject transport device, in some embodiments, is a transport device that has substantially the same model, displacement, engine or motor power, passenger capacity and/or vehicle curb weight as the new energy vehicle transport device used by the user. In some embodiments, the new energy vehicle and the baseline fuel vehicle that have similar attributes and that may be provided for analogy may meet one or more, and in some cases, all of the following conditions: 1) the utilized project new energy vehicle and the baseline fuel-burning vehicle belong to the same or approximately the same vehicle model; 2) the project new energy vehicle and the baseline fuel-burning vehicle have the same or approximately the same passenger capacity; and 3) the vehicle curb weights thereof should be in the same range, for example.

In some embodiments, the new energy vehicle utilized by the user may be a battery electric vehicle of the first model from a company A and a hybrid electric vehicle of the second model from the company A, for example. Herein, the main power performance of the battery electric vehicle of the first model from the company A may be curb weight=1650 kg and the electricity consumption per hundred kilometers in an operating condition=13.8 kWh/100 km, for example. The main power performance of the hybrid electric vehicle of the second model from the company A may be curb weight=1690 kg, the electricity consumption per hundred kilometers in an operating condition=14.2 kWh/100 km and the comprehensive fuel consumption per hundred kilometers in an operating condition=1.0 L/100 km (i.e., 1000 g/100 km).

Based on the above exemplary new energy vehicles (the battery electric vehicle of the first model from the company A and the hybrid electric vehicle of the second model from the company A) and the above analogous conditions about the similar attributes, the corresponding baseline vehicle model and its main parameters may be selected as shown in Table 1 below.

TABLE 1

| Model of new energy vehicle | First model from company A | Second model from company A |
| --- | --- | --- |
| Model of baseline vehicle | Third model from company B: 1.8 L Manual Comfort&Elegancy Standard Model 2013 | Fourth model from company A: 1.5 MT Comfort Model |
| Length/width/height of vehicle (mm) | 4700 × 1765 × 1490 | 4533 × 1705 × 1490 |
| Curb weight (kg) | 1265 | 1210 |
| Passenger capacity | 4 | 4 |

In some embodiments, the above baseline emission BE may be determined based on the following formula (2), for example:

$$BE=EF_{BL,km,i}*DD_i*10^{-12} \quad (2)$$

Here BE indicates the baseline emission in units of (t $CO_2$), for example; $EF_{BL,km,i}$ indicates an emission factor of the baseline vehicle model i in units of (g $CO_2$/km), for example; $DD_i$ indicates a traveled distance of the new energy vehicle model i used by the user in units of (km). The traveled distance DIN for example, comes from the carbon behavior data of the new energy vehicle transport device, which is measured in real time and packaged to upload to the blockchain in a predetermined time interval. In some embodiments, the traveled distance may be actually measured by the on-board module of the transport device or the application on the mobile terminal and stored on the distributed storage devices. In some embodiments, the factor of the service life of the vehicle may be taken into account in determination of the Baseline Emission (BE) and the traveled distance $DD_i$ of the new energy vehicle model i. For example, the carbon emission reduction equivalent may be determined based on $BE_y$ indicative of the baseline emission in the year of y, the emission factor of the baseline vehicle model i and the annual average traveled distance $DD_{i,y}$ of the vehicle model i of the transport device in the year of y.

In some embodiments, the above mentioned emission factor $EF_{BL,k,i}$ of the baseline vehicle model i may be determined, for example, based on the following formula (3):

$$EF_{BL,km,i} = SFC_i * NCV_{BL,i} * EF_{BL,i} * IR_t \quad (3)$$

Here, SFC indicates the fuel consumption rate of the baseline vehicle model i in units of (g/km). $NCV_{BL,i}$ indicates the net heating value of the fossil fuel consumption of the baseline vehicle model i in units of (J/g). $EF_{BL,i}$ indicates the emission factor of the fossil fuel consumption of the baseline vehicle model i in units of (g $CO_2$/TJ). $IR_4$ indicates the technical improvement factor of the baseline vehicle in the year of t. The default value of the technical improvement factor is 0.99 for all baseline vehicle models. t indicates the year of the technical improvement, which depends on the lifetime data of each vehicle model. When there is a technical improvement in the year of t compared with the year of t−1, the technical improvement factor may be adjusted.

In some embodiments, the project emission (PE) of the transport device may be determined, for example, based on the following formula (4):

$$PE = SECN_{PJ,i} * EF_{elect}/(1-TDL)*10^3 + SFC_{PJ,i} * NCV_{pj,i} * EF_{PJ,i} * 10^{-12} \quad (4)$$

Here PE indicates the project emission in units of (g$CO_2$), for example.

$SECN_{PJ,i}$ indicates the electricity consumption of the type of the new energy vehicle used by the user in units of (kWh), for example. In some embodiments, $SEC_{PJ,i}$, for example, comes from the carbon behavior data of the transport device, which is measured in real time and stored on the distributed storage devices or packaged to upload to the blockchain in a predetermined time interval. In some embodiments, $SEC_{PJ,i}$ may be determined based on a vehicle specification in urban environment provided by the manufacturer. For example, $SEC_{PJ,i}$ for the aforementioned hybrid electric vehicle of the second model from the company A may be obtained by 14.2 kWh/100 km multiplied by the travelled distance $DD_i$, and $SECN_{PJ,i}$ for the battery electric vehicle of the first model from the company A may be obtained by 13.8 kWh/100 km multiplied by the travelled distance $DD_i$. In some embodiments, the $SEC_{PJ,i}$ may be determined by cross checking the data measured in real time and the related data in the vehicle specification, and choosing the data with a higher electricity consumption from the above two data.

$EF_{elect}$ indicates the $CO_2$ emission factor of the electricity consumption of the new energy vehicle model i in units of (kg$CO_2$/kWh). In some embodiments, $EF_{elect}$ may be determined based on the data released by a third party authority, which, for example, may be the data released by Power Grid Baseline Emission Factor of China in 2006.

TDL indicates the average loss of the transmission and distribution of electricity. For example, TDL may be determined based on the parameters of a certain power grid. The TDL, for example, may be 20%.

$SFC_{PJ,i}$ indicates fuel consumption of the new energy vehicle (hybrid electric vehicle) model i in units of (g), for example. In some embodiments, the $SFC_{PJ,i}$, for example, comes from the carbon behavior data of the transport device, which is measured in real time and stored on the distributed storage devices or packaged to upload to the blockchain in a predetermined time interval. In some embodiments, the $SFC_{PJ,i}$ may be determined based on the vehicle specification in urban environment provided by the manufacturer. For example, the $SFC_{PJ,i}$ for the hybrid electric vehicle of the second model from the company A may be obtained by 1000 g/100 km multiplied by the travelled distance $DD_i$. In some embodiments, the $SFC_{PJ,i}$ may be determined by cross checking the data measured in real time and the related data in the vehicle specification, and choosing the relatively small data from the above two data.

$NCV_{pj,i}$ indicates the net heating value of the fossil fuels consumed by the new energy vehicle (hybrid electric vehicle) model i in units of (J/g), for example. The $NCV_{pj,i}$ may be preset based on the parameters provided by energy authoritative institutions, e.g., based on the data provided in *China Energy Statistical Yearbook of 2016*.

$EF_{pj,i}$ indicates the $CO_2$ emission factor when the new energy vehicle (hybrid electric vehicle) consumes fossil fuels in units of (g $CO_2$/TJ), for example.

In some embodiments, the determination of the above parameters may take into account the influence of the factor of the vehicle service life y on the data. In the above parameters, $SFC_i$, $EF_{elect}$, $EF_{BL,i}$ and $NCV_{BL,i}$ for computing the baseline emission and $NCV_{pj,i}$ and $EP_{PJ,I}$ for computing the emission of the transport device may be preset and stored on distributed storage devices checked or supervised by a third party, which may be set to be updatable so as to update in accordance with different situations.

At block 208, the carbon emission reduction equivalent may be transmitted to the blockchain platform for storage in a first account associated with the first object. The first object may be associated with a plurality of transport devices. In some embodiments, the first object may be a manufacturing enterprise of the new energy vehicle or a service provider of the shared bicycle 114, for example. The carbon emission reduction equivalent, which is determined based on the carbon behavior data of the individual user using the transport device, is stored in the associated enterprise account, which may facilitate aggregating small amounts of carbon emission reduction equivalents generated by a plurality of individual users and may facilitate performing subsequent third party certification, carbon token exchange or other carbon trading based on the aggregated carbon emission reduction equivalents.

Regarding the transmission of the carbon emission reduction equivalent to the blockchain platform, in some embodiments, in response to at least one of 1) reaching a preset time interval and 2) data amount of the acquired identification data and the carbon behavior data exceeding a predetermined value, the determined carbon emission reduction equivalent is packaged and transmitted to the blockchain platform.

Regarding the transmission of the raw identification data and the carbon behavior data to the blockchain platform, in some embodiments, in response to at least one of 1) reaching a preset time interval and 2) data amount of the acquired identification data and the carbon behavior data exceeding a predetermined value, the acquired raw identification data and the carbon behavior data are packaged and transmitted to the distributed storage devices (e.g., being stored to the distributed storage devices via the hash storage service module 182) and a hash value of the identification data and the carbon behavior data is computed and packaged to transmit to the blockchain platform. By setting the above preset time interval or the predetermined value of data amount, the raw identification data and the carbon behavior data acquired from the network in real time and the data of the carbon emission reduction equivalent determined via the smart contract may be packaged and transmitted to the blockchain in response to reaching the preset time interval and/or the acquired data amount exceeding the predetermined value, rather than being directly transmitted to the blockchain in real time, which may significantly saves the hashrate and costs of the blockchain. In some embodiment, to set the preset time interval, it should be taken into account both the efficient saving of the hashrate and costs of the blockchain and the satisfaction of the user experience. For example, the time interval may be set to 24 or 12 hours, or other suitable time.

In some embodiments, in order to further save the hashrate and costs of the blockchain, the original identification data and the carbon behavior data, which are acquired from the network in real time, are packaged and stored on the distributed storage devices (such as stored on the background database for maintenance by a third party). Afterwards, the hash value of the acquired raw identification data and the carbon behavior data are computed and then packaged to transmit to the blockchain platform for depository. In some embodiments, if the data amount of the identification data and the carbon behavior acquired from the network in real time is small, it may firstly confirm whether the data amount of the identification data and the carbon behavior data reaches or exceeds a predetermined value, and then transmit the hash value of the identification data and the carbon behavior data to the blockchain platform for depository in response to confirming that the predetermined value is reached or exceeded.

At block 210, the carbon trading associated with the carbon emission reduction equivalent in the first account is published as a blockchain transaction. By publishing the carbon trading data as the blockchain transaction, the data associated with the carbon trading procedure may reach a consensus and thus cannot be tampered. Therefore, the problem that the carbon emission reduction data lacks transparency and accuracy in the traditional trading methods may be addressed.

In some embodiments, the carbon trading method 200 may further include configuring the database type for storing the data based on the characteristics of the data to be transmitted to the blockchain platform. Herein, the database type may include at least one of a database type for basic information for storing data that will not be updated once being stored, a database type for tracking information for storing the data that may be updated from time to time, and a database type for ownership information for storing the data related to ownership of the transport device and the change thereof. In some embodiments, the carbon trading method 200 may further include determining the corresponding access policy and rights of the database based on the configured database type.

In some embodiments, the carbon trading method 200 may further include issuing, distributing, circulating, charging and burning the carbon token. The carbon token is a value voucher on the blockchain platform 160 for the carbon trading method 200. The carbon token may be exchanged and circulated on the blockchain platform at a low cost based on the assurance of the technology of the blockchain underlying layer, which enhances the efficiency of the value circulation of the carbon emission reduction resources.

Figure 3:
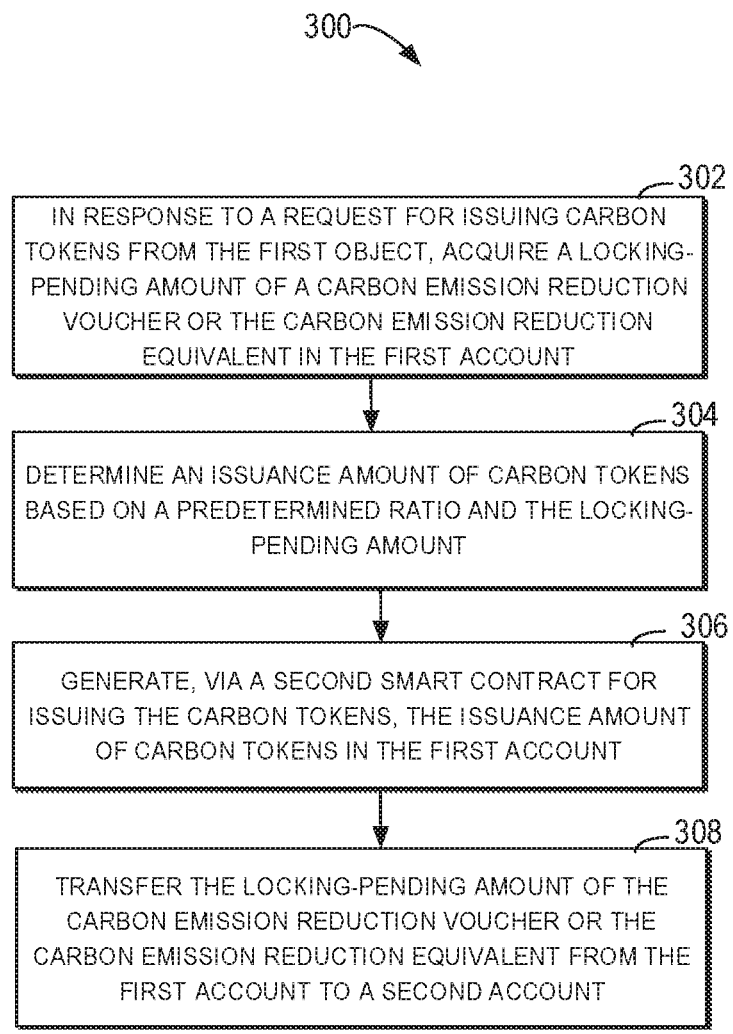
FIG. 3 illustrates a flowchart of a method 300 for issuing carbon tokens according to embodiments of the present disclosure.

FIG. 3 illustrates a flowchart of a method 300 for issuing carbon tokens according to embodiments of the present disclosure. In FIG. 3, each action is executed by a processor, for example. The method 300 may also include additional actions not shown and/or shown actions that can be omitted. The scope of the present disclosure is not restricted in this regard.

At block 302, in response to a request for issuing carbon tokens from the first object, a locking-pending amount of the carbon emission reduction voucher or the carbon emission reduction equivalent in the first account may be acquired. In some embodiments, the first account, for example, is an account associated with a new carbon emission reduction enterprise, such as an account of a manufacturing enterprise of the new energy vehicle or a service provider of the shared bicycle 114. The new carbon emission reduction enterprise may have acquired, under the audit of a third party certification authority, a certain amount of carbon emission reduction vouchers (e.g., CCER), transferred the vouchers into the first account associated with the enterprise on the blockchain platform, and registered the address of the carbon token wallet under the first account. In order to guarantee the stability of the value of the carbon token and prevent the speculators from repeatedly utilizing the carbon emission reduction equivalents or emission reduction vouchers that have been used for issuing equivalent carbon tokens, the carbon emission reduction equivalents or emission reduction vouchers for issuing the equivalent carbon tokens should be locked according to the carbon token issuing method 300. The locking-pending amount, for example, may be the data that is input by the enterprise user for issuing the carbon tokens acquired via the new energy vehicle module 172 shown in FIG. 1. In some embodiments, the locking-pending amount may be equal to or smaller than the total amount of carbon emission reduction vouchers or carbon emission reduction equivalent in the first account, such that the enterprise user may request the issuance of the carbon tokens based on all or a part of the carbon emission reduction vouchers or carbon emission reduction equivalents in the account. In some embodiments, in response to a request for issuing carbon tokens from the first object, it is confirmed whether the carbon emission reduction vouchers or the carbon emission reduction equivalents in the first account have been certified by a second object; and in response to confirming that they have been certified by the second object, the locking-pending amount of the carbon emission reduction vouchers or the carbon emission reduction equivalents in the first account is acquired. In this manner, it may ensure that at the beginning of the request from the enterprise for carbon token issuance, the related data has already gone through the audit and verification of a third party certification organization.

At block 304, an issuance amount of the carbon tokens is determined based on a predetermined ratio and the locking-pending amount of the carbon emission reduction vouchers or the carbon emission reduction equivalents. Regarding the predetermined ratio, in some embodiments, in response to detecting the request for issuing carbon tokens or the request for burning carbon tokens from the enterprise, the predetermined ratio is determined based on the total amount of carbon tokens present on the blockchain platform and the locked total amount of the carbon emission reduction vouchers or the carbon emission reduction equivalents in a second account at that time. In some embodiments, the second object may be a third party certification organization, such as DNV-GL, for example. The second account is verified and locked by the third party certification organization, for example. In this manner, the carbon tokens may be issued based on the total amount of the locked carbon emission reduction vouchers or carbon emission reduction equivalents verified and locked by the third party certification organization and the predetermined ratio, which may ensure relatively stable value of the carbon tokens and normative issuance of the carbon tokens.

At block 306, in the first account, the issuance amount of the carbon tokens are generated via a second smart contract. In some embodiments, the second smart contract is signed via a private key of the second object. The second object may be a third party certification organization, such as DNV-GL, for example. In some embodiments, the second object takes charge of auditing and verifying the smart contracts involved from issuing to burning of the carbon tokens and exchange and circulation of the carbon tokens by the enterprise, which may further ensure authority, normalization and compliance of issuance of the carbon token. In some embodiments, the second object is further responsible for auditing and verifying application program interfaces between the blockchain platform and various enterprises and for certifying and checking the ID, the acquired raw carbon behavior data and the determined carbon emission reduction equivalent of the transport device associated with the enterprise.

At block 308, the locking-pending amount of the emission reduction vouchers or the carbon emission reduction equivalents is transferred to a second account from the first account. In some embodiments, when the corresponding issuance of the carbon tokens is completed, the locking-pending amount of the emission reduction vouchers or the carbon emission reduction equivalents is transferred into the second account which is audited, verified and locked by the second object (e.g., the third party certification organization).

Figure 4:
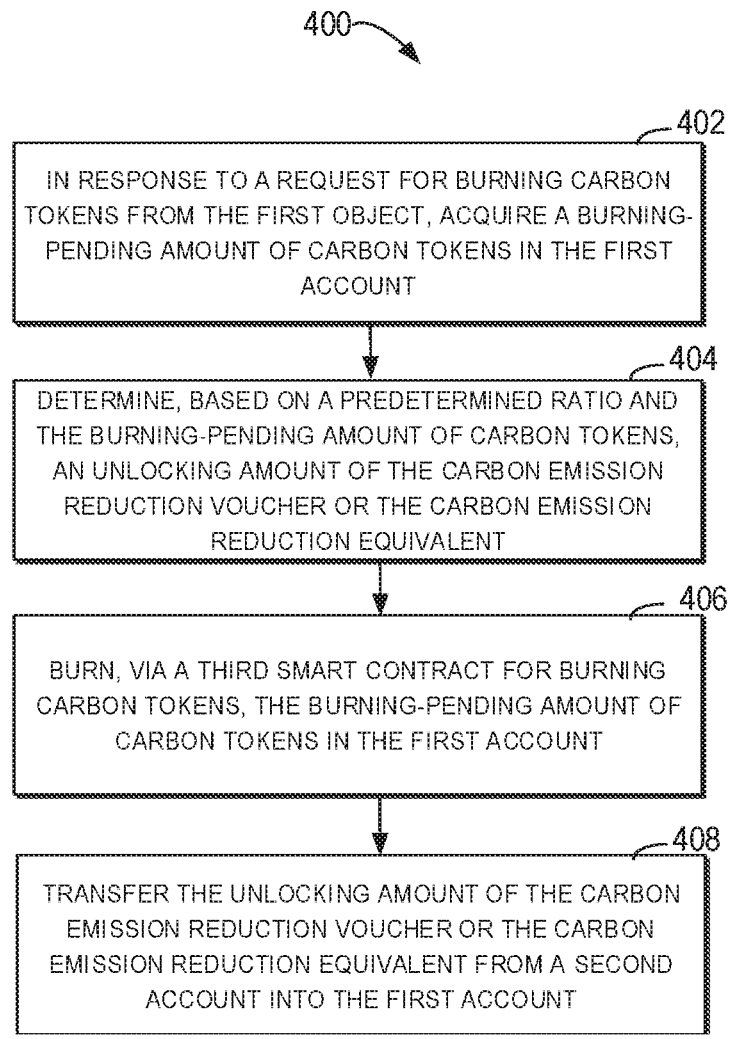
FIG. 4 illustrates a flowchart of a method 400 for burning carbon tokens according to embodiments of the present disclosure.

FIG. 4 illustrates a flowchart of a method 400 for burning carbon tokens according to embodiments of the present disclosure. At block 402, in response to a request for burning carbon tokens from the first object, a burning-pending amount of the carbon tokens in the first account is acquired. In some embodiments, in response to the request for burning carbon tokens from the first object, the address of the carbon token wallet associated with the first account and the burning-pending amount of the carbon tokens are acquired. In some embodiments, the burning-pending amount is input by the user via the new energy vehicle module 172 shown in FIG. 1, for example. In some embodiments, the burning-pending amount of the carbon tokens may be equal to or smaller than the total amount of carbon tokens in the first account, such that the enterprise user can burn all or a part of the carbon tokens in the account to exchange corresponding carbon emission reduction vouchers or carbon emission reduction equivalents. In some embodiments, in response to the request for burning carbon tokens from the first object, it is confirmed whether the carbon tokens in the first account have been certified by the second object; and in response to confirming that the carbon tokens have been certified by the second object, the burning-pending amount of the carbon tokens in the first account is acquired. In this way, it may ensure that at the beginning of the carbon token burning by the enterprise, the related data has been incorporated into the audit and verification of the third party certification organization.

At block 404, an unlocked amount of the emission reduction vouchers or the carbon emission reduction equivalents is determined based on a predetermined ratio and the burning-pending amount of the carbon tokens. At block 406, the burning-pending amount of the carbon tokens are deleted from the first account by a third smart contract. In some embodiments, the third smart contract is signed by the private key of the second object. At block 408, the unlocked amount of the emission reduction vouchers or the carbon emission reduction equivalents is transferred from the second account to the first account. In some embodiments, the unlocked emission reduction vouchers or carbon emission reduction equivalents in the first account may be reused for subsequent carbon token issuance.

Figure 5:
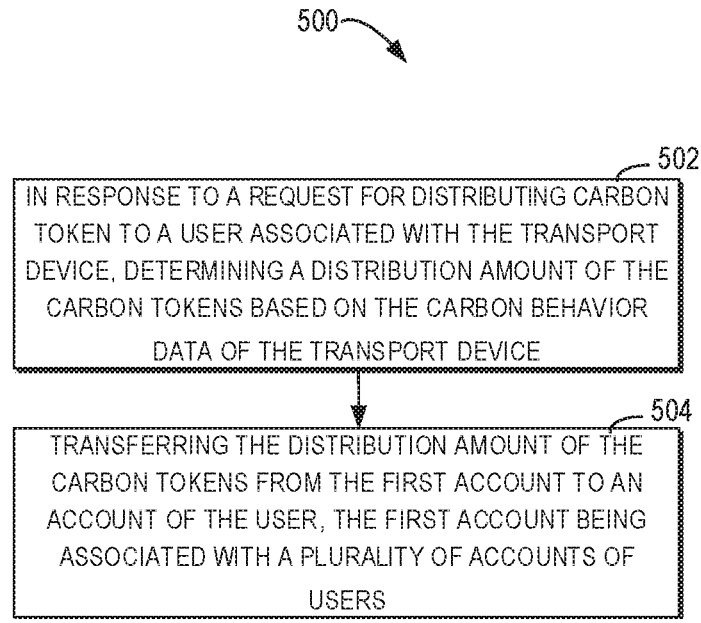
FIG. 5 illustrates a flowchart of a method 500 for distributing carbon tokens of the enterprises to individuals according to embodiments of the present disclosure.

FIG. 5 illustrates a flowchart of a method 500 for distributing carbon tokens of the enterprises to individuals according to embodiments of the present disclosure. In FIG. 5, each action may be executed by a processor, for example. The method 500 may also include additional actions not shown and/or shown actions that may be omitted. The scope of the present disclosure is not restricted in this regard.

At block 502, in response to a request for distributing carbon tokens to a user associated with the transport device, the distribution amount of the carbon tokens is determined based on the carbon behavior data of the transport device. In some embodiments, a first account may belong to a manufacturing enterprise of the new energy vehicle or a service provider of the shared new energy vehicle, for example. The user associated with the transport device may be a purchaser of the new energy vehicle or the user of the shared new energy vehicle, for example.

At block 504, the distribution amount of the carbon tokens are transferred from the first account to the user's account, the first account being associated with the accounts of the plurality of users. In some embodiments, after exchanging a given amount of carbon emission reduction equivalents or carbon emission reduction vouchers into a corresponding amount of carbon tokens in the aforementioned manner, the enterprise exchanges, in accordance with the carbon behavior data of using the new energy vehicle by the individual user associated with the first account, a corresponding amount of carbon tokens to distribute to an associated account of the individual user (i.e., an account of the individual user entrusted in the account system of the enterprise) as rewards to the individual user. In some embodiments, the user may view and copy address of his personal wallet and bind with address of his personal carbon token wallet in the account system of the enterprise. The user may initiate a request for distributing carbon tokens, and the enterprise system may receive and validate the request for distributing carbon tokens and then determine the distribution amount of the carbon tokens. Afterwards, the corresponding distribution amount of the carbon tokens is transferred from the carbon token wallet of the enterprise to the address of the personal carbon token wallet of the user, and the user may check to confirm whether the amount of carbon tokens is received in his personal wallet. The record of the distribution procedure is deposited on the blockchain. The carbon tokens gained by the enterprise or the individual users may be circulated on the blockchain platform and be used to exchange services or commodities with equivalent values, such as exchanging, via the blockchain chain-store module 173, the services or commodities with equivalent values. In this manner, the carbon tokens may be distributed from the enterprise wallets to the personal wallets entrusted to the enterprise by the individual users, such that both the individual users and the enterprises are more active in participating in the carbon emission reduction actions or projects.

In some embodiments, the carbon tokens in the personal wallet of the individual user may also be charged into the personal account of the individual user associated with the first account of the enterprise. For example, the user may initiate a token charging request and the enterprise may create a unique token charging address for the user. The user may view and copy his own token charging address in the system and the user may initiate a transfer from his personal wallet to the token charging address. The enterprise may monitor the token charging address of the user, confirm that the transfer is successful and add the carbon tokens into the personal account of the user associated with the enterprise system. Also, the user may view his token charging history in the enterprise system.

Figure 6:
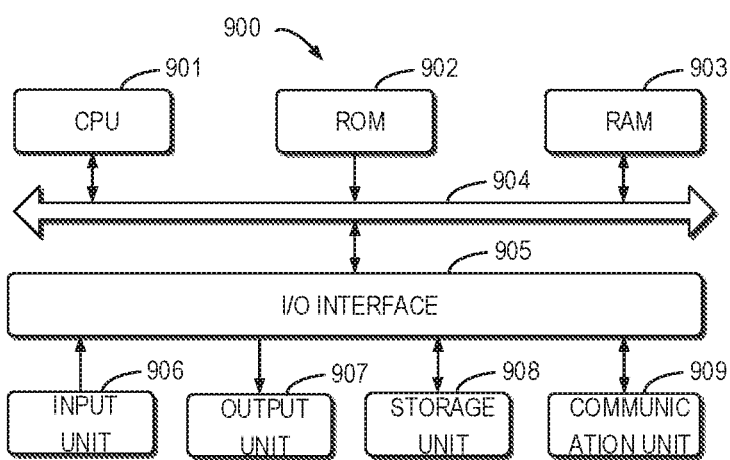
FIG. 6 schematically illustrates a block diagram of an example device 600 suitable for implementing embodiments of the present disclosure.

FIG. 6 schematically illustrates a block diagram of an example device 600 suitable for implementing embodiments of the present disclosure. The device 600 may be provided for implementing one or more hosts in the nodes of the blockchains platform 160 of FIG. 1. As shown, the device 600 may include a central processing unit (CPU) 601, which may execute various suitable actions and processing based on the computer program instructions stored in the read-only memory (ROM) 602 or computer program instructions loaded in the random-access memory (RAM) 603 from a storage unit 608. The RAM 603 may also store all kinds of programs and data required by the operations of the device 600. The CPU 601, ROM 602 and RAM 603 are connected to each other via a bus 604. The input/output (I/O) interface 605 is also connected to the bus 604.

A plurality of components in the device 600 is connected to the I/O interface 605, including an input unit 606 such as keyboard, mouse and the like, an output unit 607 such as various kinds of display and loudspeakers etc., a storage unit 608 such as a disk, an optical disk etc., and a communication unit 609 such as a network card, a modem, a wireless transceiver and the like. The communication unit 609 allows the device 600 to exchange information/data with other devices via the computer network such as Internet and/or various telecommunication networks.

The processing unit 601 executes the various methods and processing described as above, such as executing the methods 200, 300, 400 and 500. For example, in some embodiments, the methods 200, 300, 400 and 500 may be implemented as computer software programs stored in the machine-readable medium such as the storage unit 608. In some embodiments, the computer programs may be partially or fully loaded to and/or installed on the device 600 via the ROM 602 and/or the communication unit 609. When the computer programs are loaded to the RAM 603 and executed by the CPU 601, one or more operations of the above described methods 200, 300, 400 and 500 may be implemented. Alternatively, in some other embodiments, the CPU 601 may be configured to execute one or more actions of the methods 200, 300, 400 and 500 in any other suitable manners such as by means of firmware.

The present disclosure may be implemented as methods, apparatuses, a system and/or a computer program product. The computer program product may include a computer-readable storage medium loaded with computer-readable program instructions for implementing various aspects of the present disclosure.

The computer-readable storage medium may be a tangible apparatus that maintains and stores instructions utilized by the means for executing the instructions. The computer-readable storage medium may be but not limited to electrical storage devices, magnetic storage devices, optical storage devices, electromagnetic storage devices, semiconductor storage devices or any appropriate combinations of the above. More concrete examples of the computer-readable storage medium (non-exhaustive list) include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, a floppy disk, a mechanical coding device, a punched card or a projection structure in a slot stored with instructions thereon, and any appropriate combinations of the above. The computer-readable storage medium used herein should not be interpreted as transient signals per se, such as radio waves or freely propagated electromagnetic waves, electromagnetic waves propagated via waveguides or other transmission media (such as optical pulses via fiber-optic cables), or electric signals propagated via electric wires.

The computer-readable program instructions described herein can be downloaded from the computer-readable storage medium to respective computing/processing devices, or to an external computer or external storage via the Internet, a local area network, a wide area network and/or a wireless network. The network may include copper-transmitted cables, optical fiber transmissions, wireless transmissions, routers, firewalls, switches, network gateway computers and/or edge servers. The network adapter card or network interface in each computing/processing device receives computer-readable program instructions from the network and forwards the computer-readable program instructions for storage in the computer-readable storage medium of the computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages such as Smalltalk, C++ and the like and traditional procedural programming languages such as C language or similar programming languages. The computer-readable program instructions may be implemented completely on the user computer, partially on the user computer, as an independent software package, partially on the user computer and partially on the remote computer, or completely on the remote computer or server. In case that the remote computer is involved, the remote computer may be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit may execute computer-readable program instructions to implement various aspects of the present disclosure.

Each aspect of the present disclosure is disclosed here with reference to the flow charts and/or block diagrams of the method, apparatus (system) and computer program product according to embodiments of the present disclosure. It should be understood that each block of the flow chart and/or block diagram and combinations of the blocks in the flow charts and/or block diagrams may be implemented by the computer-readable program instructions.

The computer-readable program instructions may be provided to the processor of a general-purpose computer, a dedicated computer or other programmable data processing apparatuses to manufacture a machine, such that the instructions that, when executed by the processor of the computer or other programmable data processing apparatuses, may generate an apparatus for implementing functions/actions stipulated in one or more blocks in the flow charts and/or block diagrams. The computer-readable program instructions may also be stored in the computer-readable storage medium and cause the computer, programmable data processing apparatus and/or other devices to work in a specific manner, such that the computer-readable medium stored with instructions contains an article of manufacture, including instructions for implementing various aspects of the functions/actions stipulated in one or more blocks of the flow charts and/or block diagrams.

The computer-readable program instructions may also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow charts and/or block diagrams.

The flow charts and block diagrams in the drawings illustrate system architecture, functions and operations that may be implemented by the device, method and computer program product according to multiple implementations of the present disclosure. In this regard, each block in the flow charts or block diagrams may represent a module, a part of program section or codes, wherein the module and the part of program section or codes include one or more executable instructions for performing stipulated logic functions. In some alternative implementations, it should be noted that the functions indicated in the block can also take place in other orders than those indicated in the drawings. For example, two successive blocks may be in fact executed in parallel or sometimes in a reverse order dependent on the involved functions. It should also be noted that each block in the block diagrams and/or flow charts and combinations of the blocks in the block diagrams and/or flow charts may be implemented by a hardware-based system exclusive for executing stipulated functions or actions, or by a combination of dedicated hardware and computer instructions.

Various embodiments of the present disclosure have been described above and the above description is only exemplary rather than exhaustive. The present disclosure is not limited to the embodiments disclosed herein. Many other modifications and alterations are obvious for those skilled in the art without departing from the scope and spirit of the explained various embodiments. The selection of terms in the text aims to best explain principles and actual applications of each embodiment and technical improvements made to the technology in the market by each embodiment, or enable other ordinary skilled in the art to understand embodiments of the present disclosure.

The above description only gives optional embodiments of the present disclosure, rather than limiting the present disclosure. For those skilled in the art, the present disclosure may have various modifications and alterations. Any amendments, equivalent substitutions, improvements and the like should be encompassed within the protection scope of the present disclosure as long as they are within the spirit and principle of the present disclosure.

We claim:

1. A method for carbon trading, comprising:
acquiring identification data and carbon behavior data of a transport device, the carbon behavior data indicating carbon consumption behavior and carbon emission reduction behavior of the transport device, and the identification data including at least an identity corresponding to the transport device;
in response to determining that the identity is in a predetermined identity set, acquiring an attribute corresponding to the transport device based on the identity;
determining, based on the carbon behavior data and a first smart contract matching with the attribute, a carbon emission reduction equivalent corresponding to the carbon behavior data, the first smart contract being provided for converting the carbon behavior data to the carbon emission reduction equivalent;
transmitting the carbon emission reduction equivalent to a blockchain platform to store in a first account associated with a first object, the first object being associated with a plurality of transport devices; and
publishing a carbon trading associated with the carbon emission reduction equivalent in the first account as a blockchain transaction;
in response to a request for issuing carbon tokens from the first object, acquiring a locking-pending amount of a carbon emission reduction voucher or the carbon emission reduction equivalent in the first account;
determining an issuance amount of carbon tokens based on a predetermined ratio and the locking-pending amount;
generating, via a second smart contract for issuing the carbon tokens, the issuance amount of carbon tokens in the first account; and
transferring the locking-pending amount of the carbon emission reduction voucher or the carbon emission reduction equivalent from the first account to a second account,
wherein transmitting the carbon emission reduction equivalent to the blockchain platform comprises:
packaging the carbon emission reduction equivalent to transmit to the blockchain platform in response to at least one of i) reaching a preset time interval and ii) a data amount of the acquired identification data and the carbon behavior data exceeding a predetermined value.

2. The method of claim 1, further comprising:
in response to at least one of i) reaching the preset time interval and ii) the data amount of the acquired identification data and the carbon behavior data exceeding the predetermined value, packaging the identification data and the carbon behavior data to transmit to distributed storage devices; and
packaging a hash value of the identification data and the carbon behavior data to transmit to the blockchain platform.

* * * * *